(12) United States Patent
Hofstrand

(10) Patent No.: US 11,969,614 B2
(45) Date of Patent: Apr. 30, 2024

(54) EXTERNAL PORTABLE STANDPIPE TOOL

(71) Applicant: Joseph Kenneth Hofstrand, West Palm Beach, FL (US)

(72) Inventor: Joseph Kenneth Hofstrand, West Palm Beach, FL (US)

( * ) Notice: Subject to any disclaimer, the term of this patent is extended or adjusted under 35 U.S.C. 154(b) by 479 days.

(21) Appl. No.: 17/195,496

(22) Filed: Mar. 8, 2021

(65) Prior Publication Data

US 2021/0275847 A1 Sep. 9, 2021

Related U.S. Application Data

(60) Provisional application No. 62/986,511, filed on Mar. 6, 2020.

(51) Int. Cl.
| | | |
|---|---|---|
| A62C 33/04 | (2006.01) | |
| A62C 35/68 | (2006.01) | |
| F16L 3/00 | (2006.01) | |

(52) U.S. Cl.
CPC .............. *A62C 33/04* (2013.01); *A62C 35/68* (2013.01); *F16L 3/003* (2013.01)

(58) Field of Classification Search
CPC ........... A62C 33/04; A62C 35/68; F16L 3/003
See application file for complete search history.

(56) References Cited

U.S. PATENT DOCUMENTS

| | | | |
|---|---|---|---|
| 2,993,503 A | 7/1961 | Pokryfke et al. | |
| 4,467,997 A * | 8/1984 | Ziaylek, Jr. | F16K 7/06 16/102 |
| 4,470,177 A | 9/1984 | Ganung | |
| 4,530,478 A * | 7/1985 | McClellan | F16L 59/135 248/62 |
| D360,128 S | 7/1995 | Huffine | |
| 6,921,053 B1 * | 7/2005 | Heck | H02G 3/0456 248/50 |
| 7,730,588 B1 | 6/2010 | Bernier | |
| 7,861,983 B2 * | 1/2011 | Lange | F16L 59/135 248/62 |
| 9,068,685 B2 * | 6/2015 | Bock | F16L 59/135 |
| 2009/0188751 A1 * | 7/2009 | Gilliam | E04G 21/3276 182/112 |

* cited by examiner

*Primary Examiner* — Anita M King

(57) ABSTRACT

An external portable standpipe tool is an apparatus used to secure the nozzle of a pressurized water supply line to provide a reliable water supply for fire suppression in place of a conventional standpipe. The external portable standpipe tool utilizes a first bracket, a second bracket, an external mounting structure, and a plurality of bracket fasteners to mount a pressurized water supply line in a desirable location. The first bracket is removably engaged to the second bracket, enabling a user to capture and retain the nozzle and supply line. The plurality of bracket fasteners is engaged into the first bracket and the second bracket is used to fix them together. The external mounting structure attaches the combined assembly of the first bracket and the second bracket to an external structure, such as a railing or support beam.

18 Claims, 6 Drawing Sheets

EXTERNAL PORTABLE STANDPIPE TOOL

The current application claims a priority to the U.S. Provisional Patent application Ser. No. 62/986,511 filed on Mar. 6, 2020. The current application is filed on Mar. 8, 2021 while Mar. 6, 2021 and Mar. 7, 2021 were on a weekend.

FIELD OF THE INVENTION

The present invention is a tool or implement used in the field of firefighting. More specifically, the invention provides a means of establishing an ad hoc standpipe system by fastening a standard supply line to an external structure.

BACKGROUND OF THE INVENTION

A standpipe system is defined by the National Fire Protection Association (NFPA 14) as: 'An arrangement of piping, valves, hose connections, and allied equipment installed in a building or structure, with the hose connection located in such a manner that water can be discharged in streams through attached hose and nozzles, for the purposes of extinguishing a fire, thereby protecting a building or structure and its contents in addition to protecting the occupants. This is accomplished by means of connection to water supply systems or by means of pump tanks and other equipment necessary to provide an adequate supply of water to the hose connections.'

Dry standpipes, specifically, are permanent conduits installed into high-rise buildings or extended lateral structures (bridges and the like) as part of an emergency fire suppression infrastructure. In case of fire, firefighters may connect a pressurized water supply to a ground-level access point to enable water to be dispersed from various distributed terminals positioned throughout a building. This system enables the distributed terminals to serve as secondary hydrants pre-positioned in otherwise inaccessible areas, such as the upper stories of high-rise buildings.

However, these systems are limited by the allowances of potentially decades-old regulations and building practices; shortcomings compounded by the potential for inadequate maintenance of these systems. To wit—emergency preparations are too-often neglected until the emergency arrives. In case of failure of the existing standpipe systems, firefighters must supply their own water on-site to effectively combat fires without relying on any external factors. It is herein proposed that a means of securing a feed line at a remote location (e.g., near a balcony or exposed support column) might provide the functionality of a permanent standpipe utilizing standard firefighting equipment in conjunction with a singular novel tool.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

Figure 1:
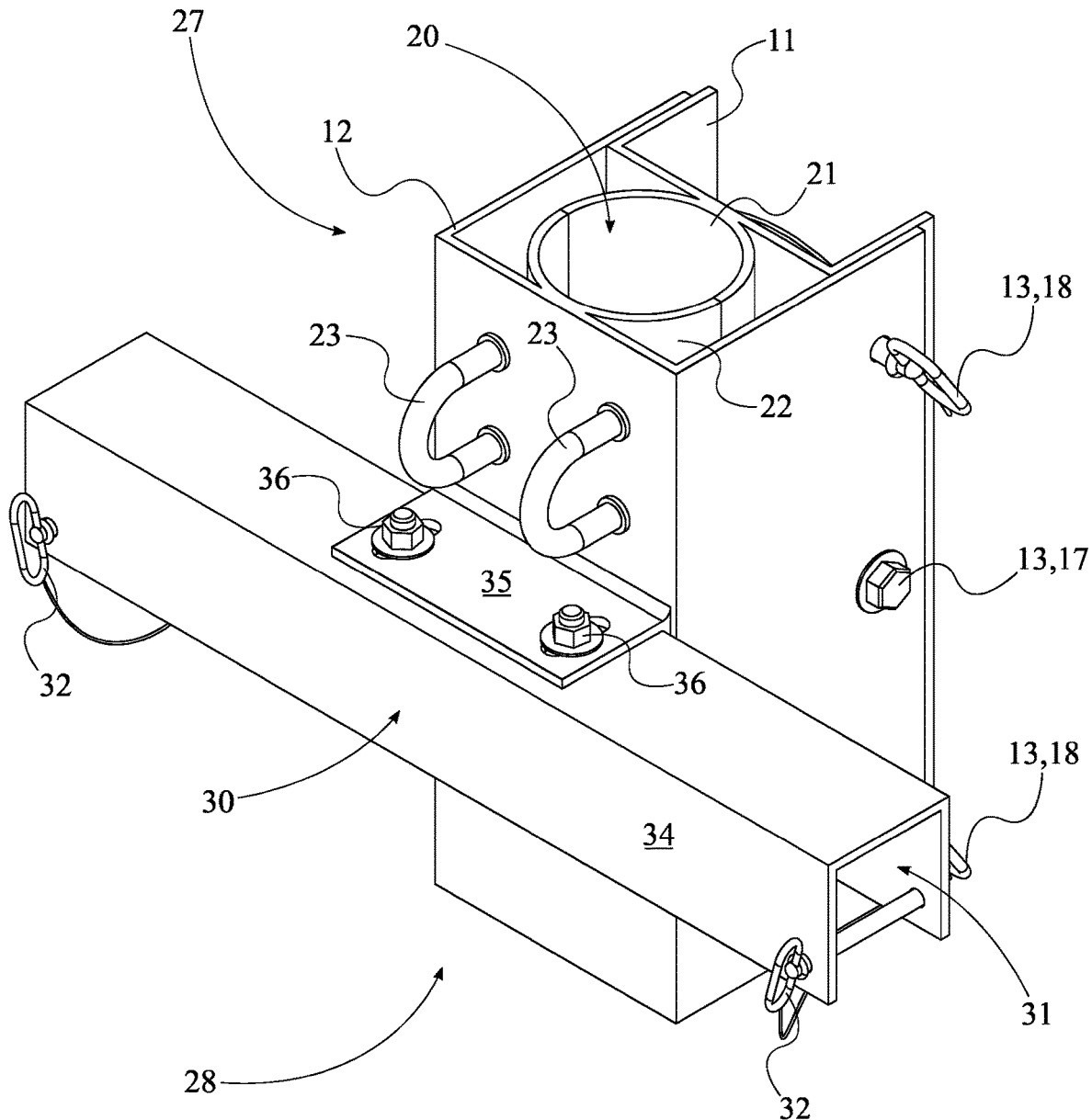
FIG. 1 is a top-front-left perspective view of one embodiment of the present invention.
Figure 2:
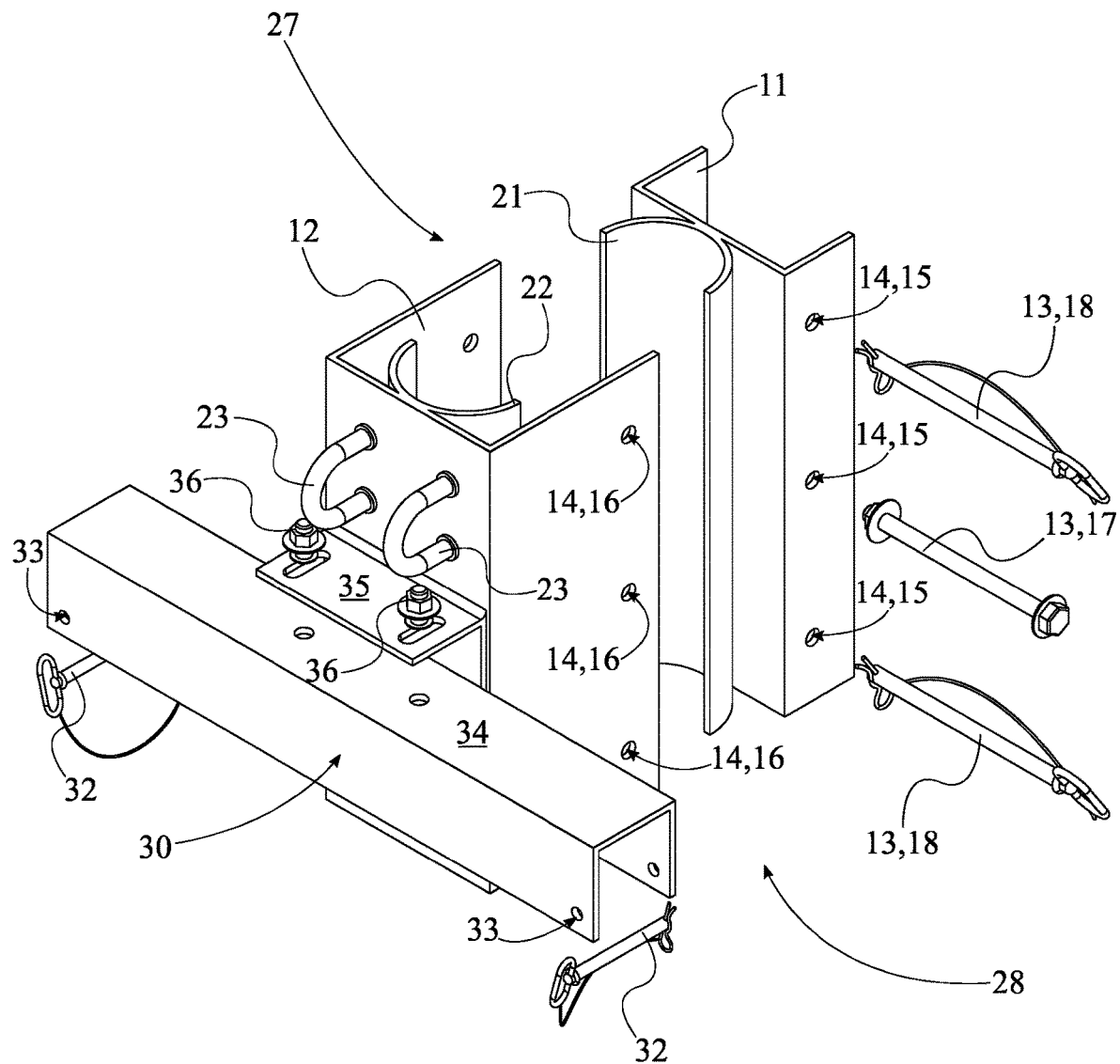
FIG. 2 is an exploded perspective view thereof.
Figure 3:
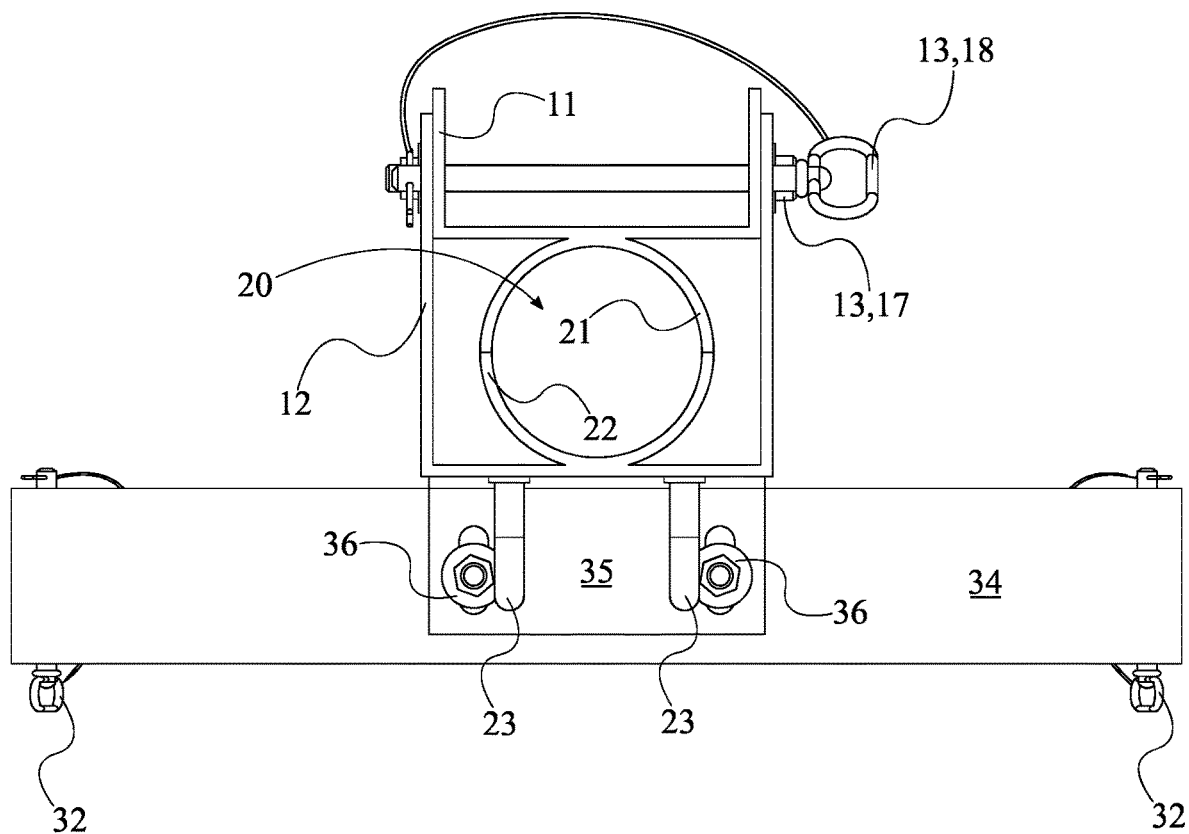
FIG. 3 is a top plan view thereof.
Figure 4:
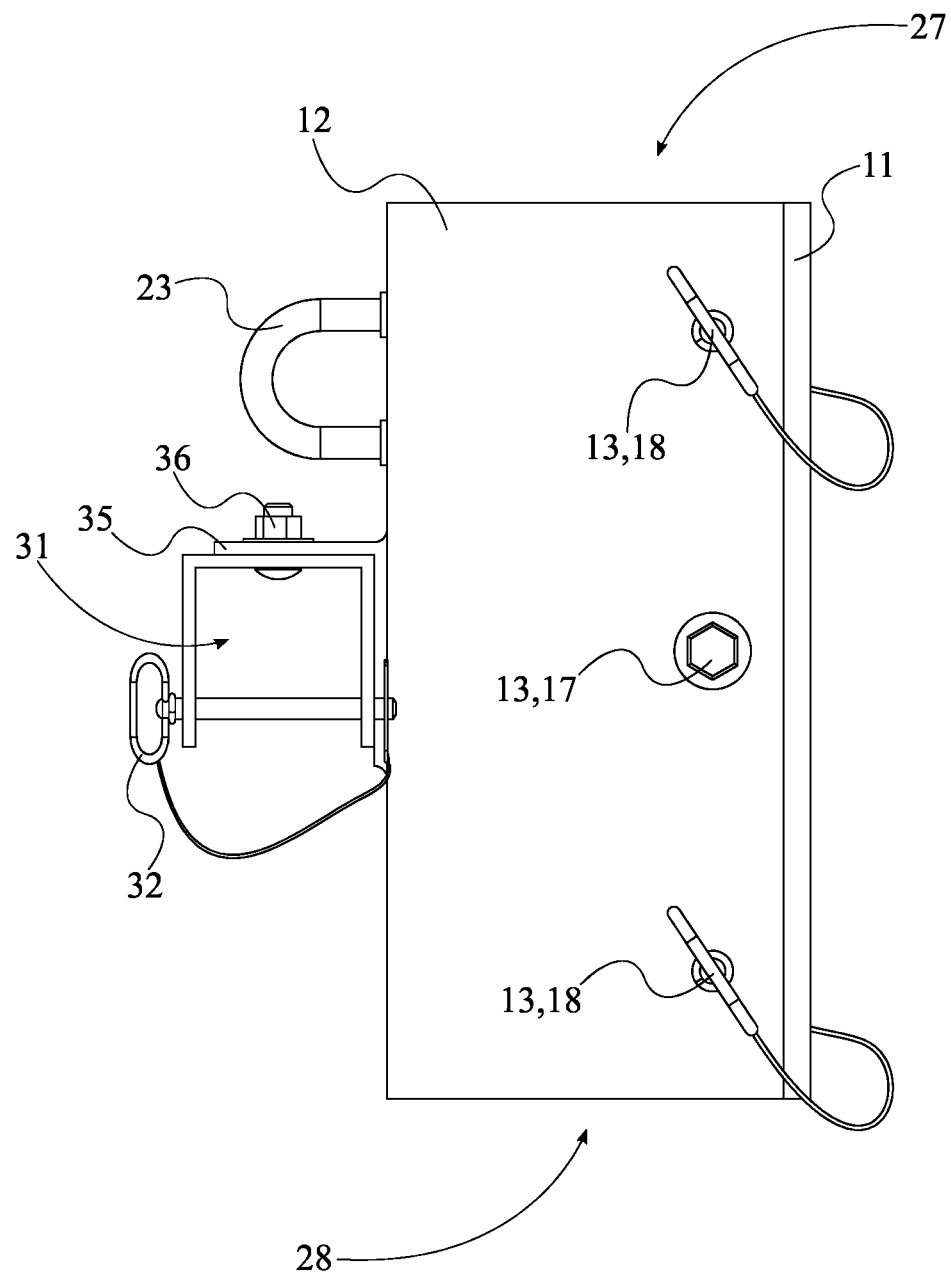
FIG. 4 is left-side elevational view thereof.
Figure 5:
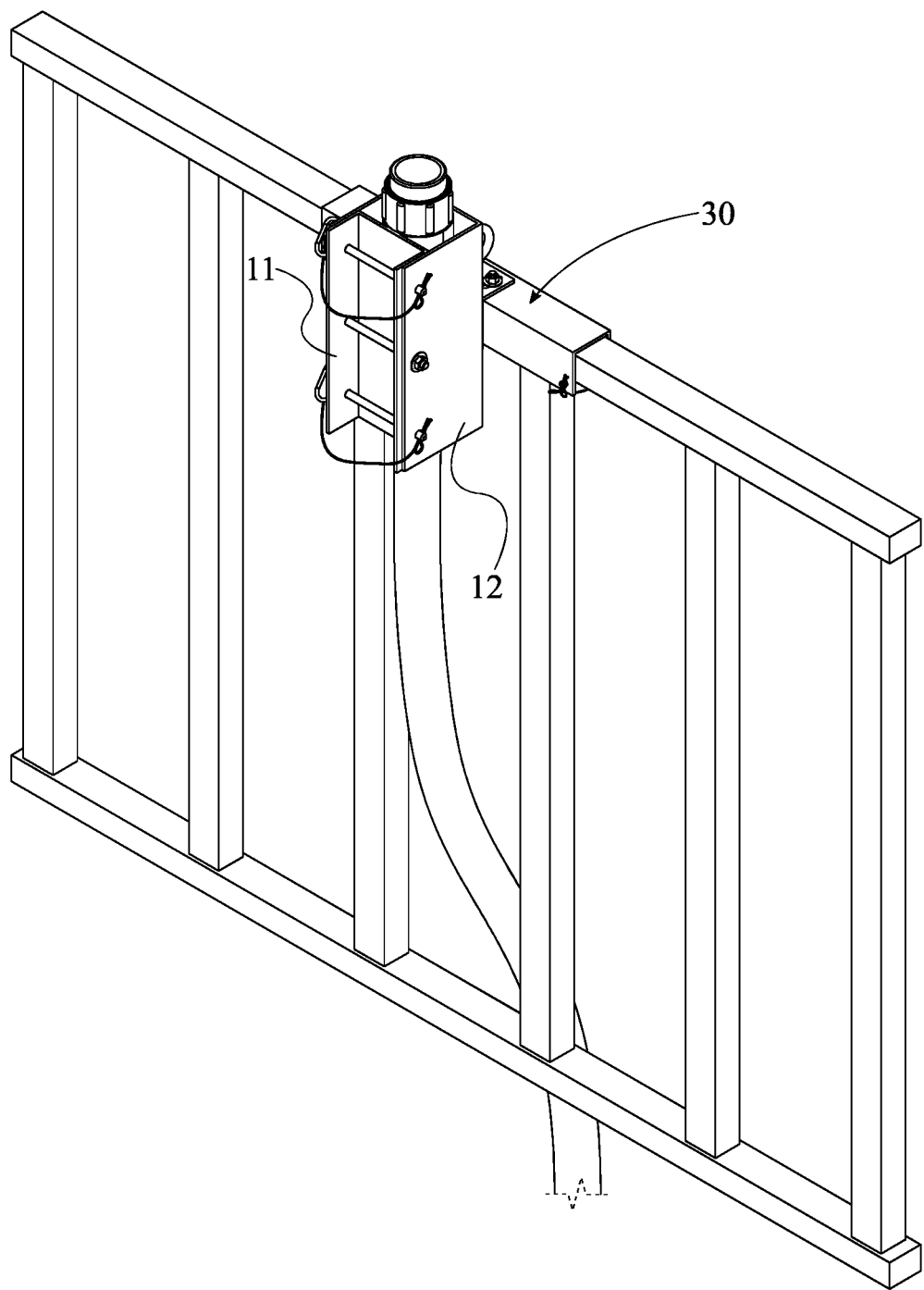
FIG. 5 is an alternate perspective view thereof, wherein the present invention is shown mounted between an exemplary supply line and an exemplary railing.
Figure 6:
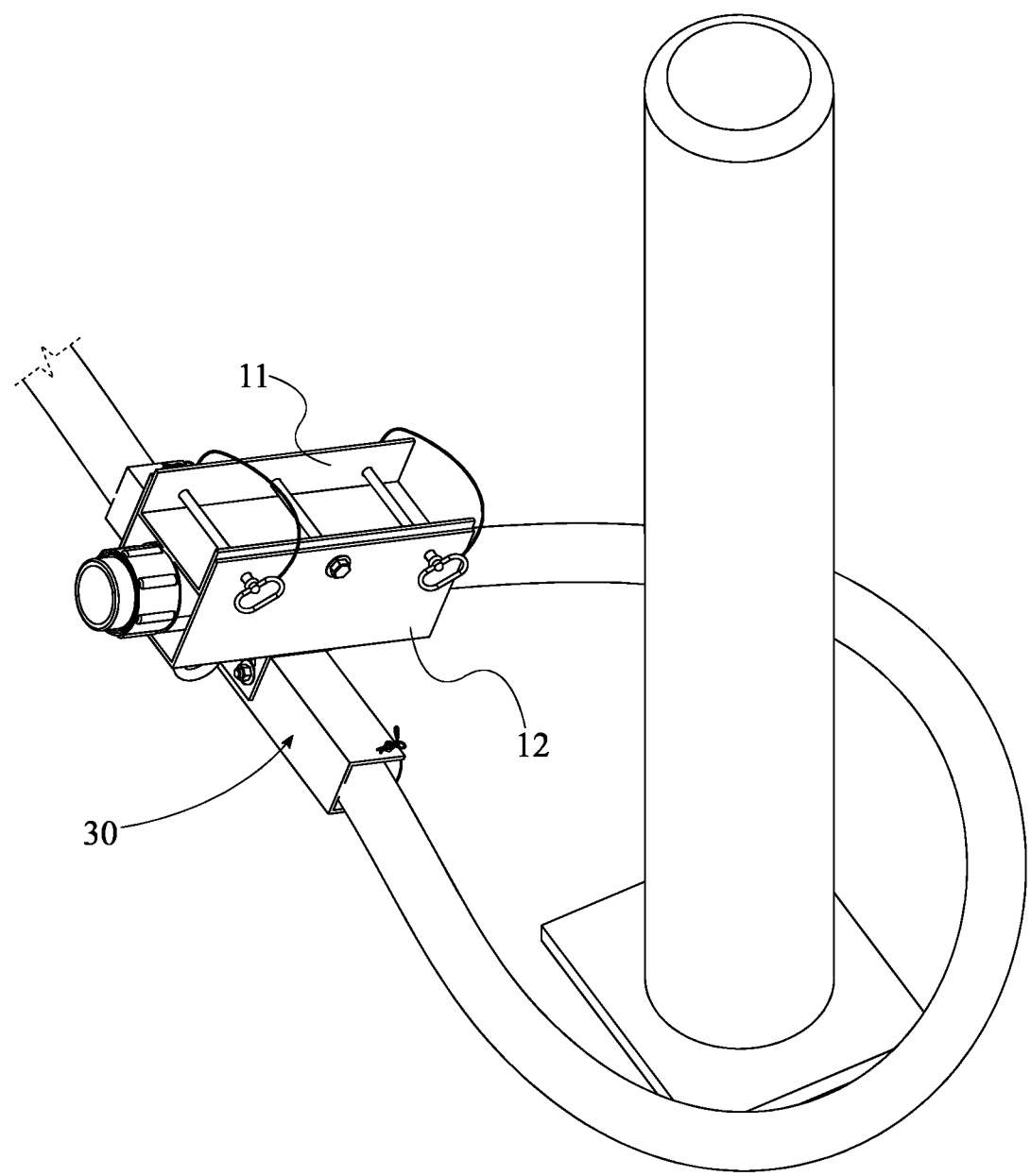
FIG. 6 is an alternate perspective view thereof, wherein the present invention is shown mounted to a looped length of hose to enable attachment to a large structural element.

In reference to FIG. 1 through 6, the present invention is an external portable standpipe tool comprising a first bracket 11, a second bracket 12, an external mounting structure 30, and a plurality of bracket fasteners 13. In the preferred embodiment the first bracket 11 and the second bracket 12 each extend between an upper end 27 and a lower end 28, wherein the first bracket 11 is removably engaged to the second bracket 12. The first bracket 11 and the second bracket 12 each constitute rigid structural members suitable for capturing and supporting the nozzle of a supply line, ideally with the diameter of the nozzle being greater than the inner diameter of the combined form of the first bracket 11 and the second bracket 12. The first bracket 11 and the second bracket 12 each further comprise a plurality of locking apertures 14, the plurality of bracket fasteners 13 being removably engaged into the plurality of locking apertures 14. The engagement of the plurality of bracket fasteners 13 into the plurality of locking apertures 14 prevents the separation of the first bracket 11 from the second bracket 12, thereby preventing the nozzle from slipping out of engagement as shown in FIGS. 5 and 6. Accordingly, removal of the plurality of bracket fasteners 13 from the plurality of locking apertures 14 enables a user to mount and dismount the supply line and nozzle as illustrated in FIG. 2.

As shown in FIG. 4, the external mounting structure 30 is mounted to the second bracket 12, opposite first bracket 11 with a mounting channel 31 being formed within the external mounting structure 30. The external mounting structure 30 broadly defines any engagement structure configured to capture a permanent fixture of a building across a variety of possible embodiments. As shown in FIG. 5, the mounting channel 31 ideally conforms to standard bannister or balcony railing dimensions to allow for direct attachment to standard building fixtures. This configuration may also be suitable for attachment to the rungs of a ladder, enabling a firefighter to mount the present invention directly to a ladder truck in an alternate use-case. More generally, the external mounting structure 30 is configurable to bear the weight of a suspended 3" supply line from any height or location. A person of ordinary skill may realize that the embodiments of the mounting channel 31, first bracket 11, and second bracket 12 may comprise a variety of materials and dimensions to support this function, with an emphasis on high-strength, low-weight construction. In exemplary use, 1 linear foot of supply line would weight approximately 0.84 pounds, necessitating a significantly more robust embodiments to support applications up to 100 stories (1000 ft of line, 840 lbs) and beyond.

In reference to FIGS. 2 and 3, the present invention may further comprise a first sleeve 21 and a second sleeve 22. The first sleeve 21 is mounted to the first bracket 11 and the second sleeve 22 is mounted to the second bracket 12, with a retention conduit 20 being formed through the combination of the first sleeve 21 and the second sleeve 22 between the upper end 27 and the lower end 28. The first sleeve 21 and the second sleeve 22 ideally constitute hemicylindrical bearing elements inserted into the first bracket 11 and second bracket 12, respectively, to better accommodate a supply line. As shown in FIG. 3, the retention conduit 20 defines a hollow cylindrical space traversing the present invention from the upper end 27 to the lower end 28, fully supporting the supply line to the rear of the nozzle. The retention conduit 20 may define a compression fit against the outer diameter of the supply line when the line is fully pressurized, thereby increasing the contact surface between the present invention and a supported supply line.

In reference to FIGS. 2 and 4, the plurality of locking apertures 14 may further comprise a plurality of first locking apertures 15 and a plurality of second locking apertures 16. In the preferred embodiment, the plurality of first locking apertures 15 is dispersed between the upper end 27 and the lower end 28 of the first bracket 11 and the plurality of second locking apertures 16 is dispersed between the upper end 27 and the lower end 28 of the second bracket 12. The alignment of the plurality of first locking apertures 15 with the plurality of second locking apertures 16 ensures that the first bracket 11 and the second bracket 12 may be effectively coupled with the plurality of bracket fasteners 13 with a minimum number of operations. This rapid engagement-disengagement, utilizing a parallel set of engagement features, enables a single firefighter to rapidly assembly and mount the present invention in an emergency (i.e., during normal use). Accordingly, the separation of the first bracket 11 from the second bracket 12 will necessarily require the removal of the plurality of bracket fasteners 13. The complexity of the overall invention is also decreased by the alignment of contiguous engagement features, as the total quantity of each of the plurality of bracket fasteners 13 may be reduced.

The external mounting assembly may be equipped with a plurality of channel fasteners 32 in at least one embodiment. Accordingly, a plurality of channel apertures 33 is dispersed along the external mounting structure 30, wherein the plurality of channel apertures 33 traverses the external locking structure and the mounting channel 31. As shown in FIGS. 1 and 4, the plurality of channel fasteners 32 is removably engaged into the plurality of channel apertures 33, ideally in a similar fashion to the plurality of bracket fasteners 13 and the plurality of locking apertures 14. The plurality of channel fasteners 32 are supplementary engagement features for the external mounting system, capturing and external structure or member within the mounting channel 31 by partially enclosing the mounting channel 31 across an otherwise exposed facet. As shown in FIG. 5, the plurality of channel fasteners 32 may be engaged against a balcony railing to prevent the external mounting structure 30 from lifting clear of said railing, thereby ensuring that the present invention remains fixed to a host structure. Likewise, FIG. 6 shows an exemplary configuration of the present invention wherein the supply line is utilized as a retention member, wherein the supply line encircles an external structure and is retained within the mounting channel 31 by the plurality of channel fasteners 32.

In another embodiment of the present invention, the external mounting structure 30 further comprises a modular fixture 34, a receiver shelf 35, and at least one accessory fastener 36. Referring to FIG. 2, the receiver shelf 35 extends from the second bracket 12 opposite the second sleeve 22 and the modular fixture 34 is mounted to the receiver shelf 35 through the at least one accessory fastener 36. The modular fixture 34 ideally defines a substantially hollow conduit exposed along at least one major facet. In various alternate embodiments, the modular fixture 34 may also define a hook, latch, or grapple-fixture as may be realized by person of ordinary skill. The receiver shelf 35 defines an interstitial receiving structure between the second bracket 12 and any embodiment of the modular fixture 34, ideally attaching to said alternate embodiments through a universal hardware assembly common to all embodiments. The at least one accessory fastener 36 ideally constitutes a user-configurable element of the aforementioned universal hardware assembly. Once the modular fixture 34 is engaged to the receiver shelf 35, the mounting channel 31 traverses laterally through the modular fixture 34. Accordingly, the present invention may attach to any compatible structure according to the embodiment of the modular fixture 34 that is equipped.

As outlined above, rapid deployment of the present invention is likely to be necessary under normal operating conditions. It is therefore proposed that the deployment of the present invention may accelerated by providing an optional two-stage assembly system. More specifically, the plurality of bracket fasteners 13 may comprise a fixed fastener 17 and at least one quick-detach fastener 18 as shown in FIGS. 1 and 2. The fixed fastener 17 and each of the at least one quick-detach fastener 18 are each removably engaged into one of the plurality of locking apertures 14. This differentiation enables the selective use of the plurality of quick-detach fasteners 18 to initially set up the present invention, followed using the fixed fastener 17 to secure the present invention into an operable position. Ideally, the plurality of quick-detach fasteners 18 constitutes a series of cotter-pinned rods or spring-detent pins that may be rapidly inserted into the plurality of locking apertures 14 to enable the present invention to support its own weight. A user might then subsequently fix the present invention into an operable configuration with a standard nut and threaded bolt, constituting the fixed fastener 17.

The present invention is ideally employed from atop an elevated structure, as described and idealized. Though the present invention is ideally portable by a single individual, it is recognized that lifting the present invention into position with mechanical assistance is preferable. Absent the use of a ladder truck, a firefighter crew will likely use a belay and hoist setup to lift equipment to the upper floors of a structure. In support of this practice, the present invention may comprise plurality of rope anchors 23 as shown in FIG. 1. The plurality of rope anchors 23 generally refers to any cleat, hook, ring, or other rope tie-off structure. The plurality of rope anchors 23 is dispersed along the second bracket 12, adjacent to the external mounting structure 30 to prevent any interference with the first bracket 11 or any captive supply lines. In the ideal application, the firefighter crew may secure hoist lines to the plurality of rope anchors 23 and lift the present invention (and a captive supply line) into an operable position on an elevated balcony or ledge.

In one preferred embodiment, the first sleeve 21, the second sleeve 22, and the first bracket 11 are ideally positioned within the second bracket 12 between the upper end 27 and the lower end 28. Referring to FIGS. 1 and 3, this nested arrangement positions multiple layers of rigid material around the supply line as the present invention is assembled for use. Consequently, the present invention is reinforced against deflection potentially caused by the suspended supply line swaying or being pulled during use. More specifically, the first sleeve 21 and the second sleeve 22 are supported and enclosed by the first bracket 11 and the second bracket 12. The first bracket 11 is then enclosed and supported by the second bracket 12 as the plurality of bracket fasteners 13 engage into the plurality of locking apertures 14, completing a multilayered enclosure for the supply line and nozzle.

Although the invention has been explained in relation to its preferred embodiment, it is to be understood that many other possible modifications and variations can be made without departing from the spirit and scope of the invention as hereinafter claimed.

What is claimed is:

1. An external portable standpipe tool comprising:
   a first bracket;
   a second bracket;
   an external mounting structure;
   a plurality of bracket fasteners;
   the first bracket and the second bracket each extending between an upper end and a lower end;
   the first bracket being removably engaged to the second bracket;
   the first bracket and the second bracket each comprising a plurality of locking apertures;
   the plurality of bracket fasteners being removably engaged into the plurality of locking apertures;
   the external mounting structure being mounted to the second bracket, opposite first bracket;
   a mounting channel being formed within the external mounting structure;
   a plurality of channel fasteners;
   a plurality of channel apertures being dispersed along the external mounting structure, wherein the plurality of channel apertures traverses the external locking structure and the mounting channel; and
   the plurality of channel fasteners being removably engaged into the plurality of channel apertures.

2. The external portable standpipe tool as claimed in claim 1 comprising:
   a first sleeve;
   a second sleeve;
   the first sleeve being mounted to the first bracket;
   the second sleeve being mounted to the second bracket; and
   a retention conduit being formed through the combination of the first sleeve and the second sleeve between the upper end and the lower end.

3. The external portable standpipe tool as claimed in claim 2 comprising:
   the first sleeve, the second sleeve, and the first bracket being positioned within the second bracket between the upper end and the lower end.

4. The external portable standpipe tool as claimed in claim 1 comprising:
   the plurality of locking apertures comprising a plurality of first locking apertures and a plurality of second locking apertures;
   the plurality of first locking apertures being dispersed between the upper end and the lower end of the first bracket; and
   the plurality of second locking apertures being dispersed between the upper end and the lower end of the second bracket.

5. The external portable standpipe tool as claimed in claim 1 comprising:
   the external mounting structure comprising a modular fixture, a receiver shelf, and at least one accessory fastener;
   the receiver shelf extending from the second bracket opposite the second sleeve;
   the modular fixture being mounted to the mounting shelf through the at least one accessory fastener; and
   the mounting channel traversing laterally through the modular fixture.

6. The external portable standpipe tool as claimed in claim 1 comprising:
   the plurality of bracket fasteners comprising a fixed fastener and at least one quick-detach fastener; and
   the fixed fastener and each of the at least one quick-detach fastener being removably engaged into one of the plurality of locking apertures.

7. The external portable standpipe tool as claimed in claim 1 comprising:
   a plurality of rope anchors; and
   the plurality of rope anchors being dispersed along the second bracket, adjacent to the external mounting structure.

8. An external portable standpipe tool comprising:
   a first bracket;
   a second bracket;
   an external mounting structure;
   a plurality of bracket fasteners;
   the first bracket and the second bracket each extending between an upper end and a lower end;
   the first bracket being removably engaged to the second bracket;
   the first bracket and the second bracket each comprising a plurality of locking apertures;
   the plurality of bracket fasteners being removably engaged into the plurality of locking apertures;
   the external mounting structure being mounted to the second bracket, opposite first bracket;
   a mounting channel being formed within the external mounting structure;
   a first sleeve;
   a second sleeve;
   the first sleeve being mounted to the first bracket;
   the second sleeve being mounted to the second bracket;
   a retention conduit being formed through the combination of the first sleeve and the second sleeve between the upper end and the lower end;
   a plurality of channel fasteners;
   a plurality of channel apertures being dispersed along the external mounting structure, wherein the plurality of channel apertures traverses the external locking structure and the mounting channel; and
   the plurality of channel fasteners being removably engaged into the plurality of channel apertures.

9. The external portable standpipe tool as claimed in claim 8 comprising:
   the plurality of locking apertures comprising a plurality of first locking apertures and a plurality of second locking apertures;
   the plurality of first locking apertures being dispersed between the upper end and the lower end of the first bracket; and
   the plurality of second locking apertures being dispersed between the upper end and the lower end of the second bracket.

10. The external portable standpipe tool as claimed in claim 8 comprising:
    the external mounting structure comprising a modular fixture, a receiver shelf, and at least one accessory fastener;

the receiver shelf extending from the second bracket opposite the second sleeve;

the modular fixture being mounted to the mounting shelf through the at least one accessory fastener; and the mounting channel traversing laterally through the modular fixture.

11. The external portable standpipe tool as claimed in claim 8 comprising:

the plurality of bracket fasteners comprising a fixed fastener and at least one quick-detach fastener; and the fixed fastener and each of the at least one quick-detach fastener being removably engaged into one of the plurality of locking apertures.

12. The external portable standpipe tool as claimed in claim 8 comprising:

a plurality of rope anchors; and the plurality of rope anchors being dispersed along the second bracket, adjacent to the external mounting structure.

13. The external portable standpipe tool as claimed in claim 8 comprising:

the first sleeve, the second sleeve, and the first bracket being positioned within the second bracket between the upper end and the lower end.

14. An external portable standpipe tool comprising:

a first bracket;

a second bracket;

an external mounting structure;

a plurality of bracket fasteners;

the first bracket and the second bracket each extending between an upper end and a lower end;

the first bracket being removably engaged to the second bracket;

the first bracket and the second bracket each comprising a plurality of locking apertures;

the plurality of bracket fasteners being removably engaged into the plurality of locking apertures;

the external mounting structure being mounted to the second bracket, opposite first bracket;

a mounting channel being formed within the external mounting structure;

a first sleeve;

a second sleeve;

the first sleeve being mounted to the first bracket;

the second sleeve being mounted to the second bracket;

a retention conduit being formed through the combination of the first sleeve and the second sleeve between the upper end and the lower end; and the first sleeve, the second sleeve, and the first bracket being positioned within the second bracket between the upper end and the lower end.

15. The external portable standpipe tool as claimed in claim 14 comprising:

the plurality of locking apertures comprising a plurality of first locking apertures and a plurality of second locking apertures;

the plurality of first locking apertures being dispersed between the upper end and the lower end of the first bracket;

the plurality of second locking apertures being dispersed between the upper end and the lower end of the second bracket;

the plurality of bracket fasteners comprising a fixed fastener and at least one quick-detach fastener; and the fixed fastener and each of the at least one quick-detach fastener being removably engaged into one of the plurality of locking apertures.

16. The external portable standpipe tool as claimed in claim 14 comprising:

a plurality of channel fasteners;

a plurality of channel apertures being dispersed along the external mounting structure, wherein the plurality of channel apertures traverses an external locking structure and the mounting channel; and the plurality of channel fasteners being removably engaged into the plurality of channel apertures.

17. The external portable standpipe tool as claimed in claim 14 comprising:

the external mounting structure comprising a modular fixture, a receiver shelf, and at least one accessory fastener;

the receiver shelf extending from the second bracket opposite the second sleeve;

the modular fixture being mounted to the mounting shelf through the at least one accessory fastener; and the mounting channel traversing laterally through the modular fixture.

18. The external portable standpipe tool as claimed in claim 14 comprising:

a plurality of rope anchors; and the plurality of rope anchors being dispersed along the second bracket, adjacent to the external mounting structure.

* * * * *